Feb. 25, 1964  W. H. FITCH ETAL  3,122,056
MULTIPLE CARRIAGE BOMB RACK
Filed Oct. 30, 1961  2 Sheets-Sheet 2
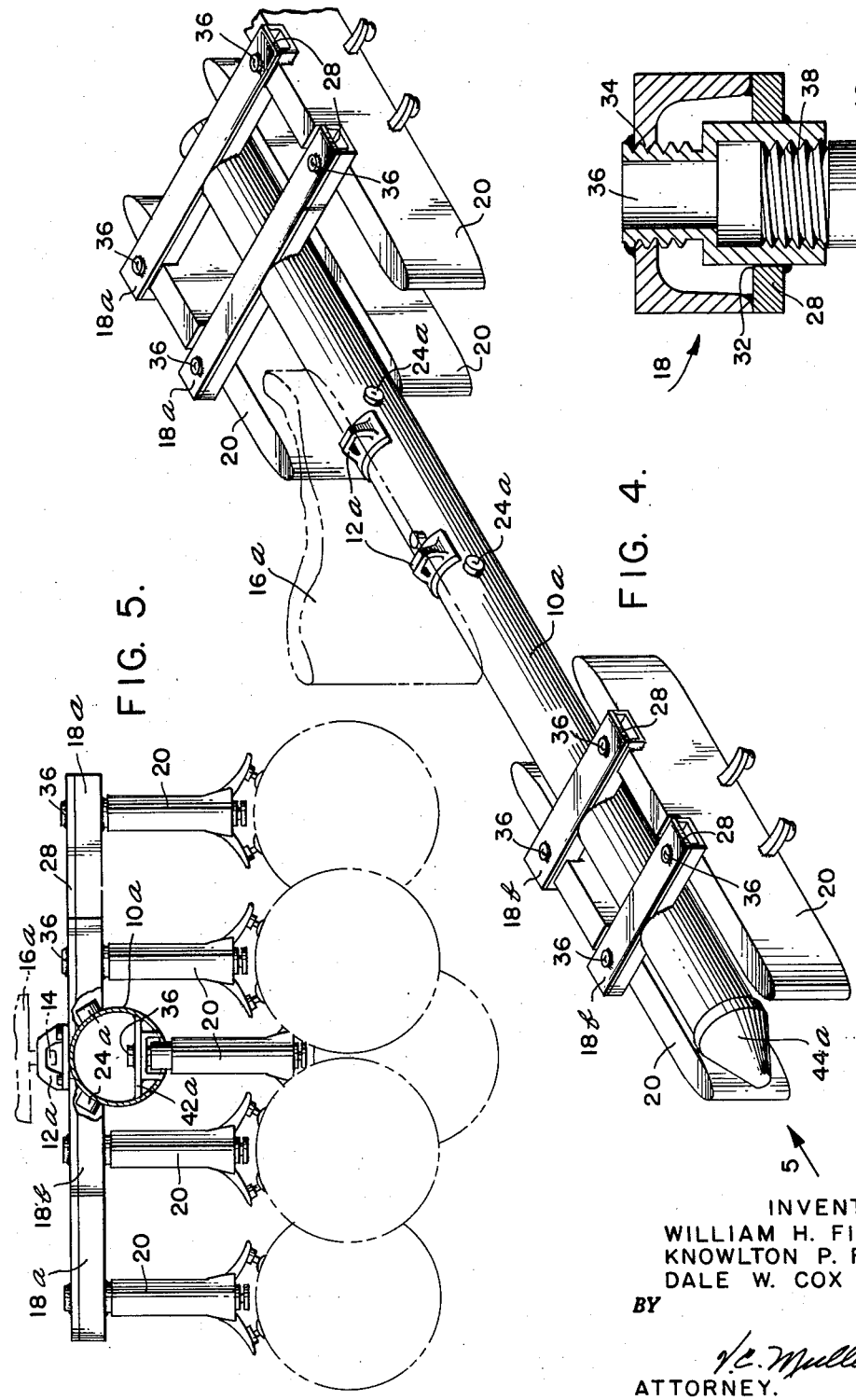
INVENTORS.
WILLIAM H. FITCH
KNOWLTON P. RICE
DALE W. COX
BY
ATTORNEY.

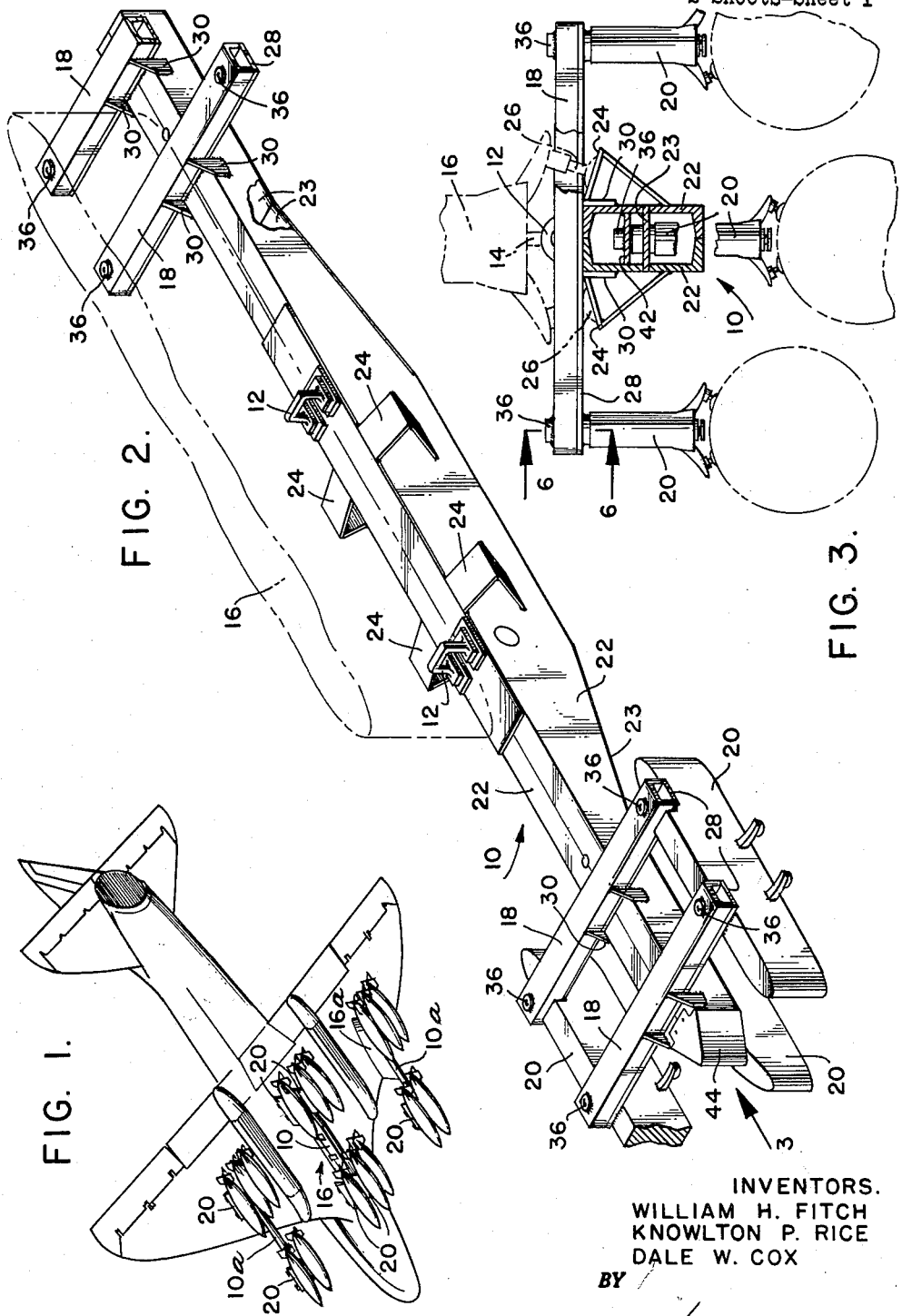

United States Patent Office 3,122,056
Patented Feb. 25, 1964

3,122,056
MULTIPLE CARRIAGE BOMB RACK
William H. Fitch, Knowlton P. Rice, and Dale W. Cox, Santa Ana, Calif., assignors to the United States of America as represented by the Secretary of the Navy
Filed Oct. 30, 1961, Ser. No. 148,779
3 Claims. (Cl. 89—1.5)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in bomb or other payload suspension apparatus for aircraft.

In certain aircraft it is conventional practice to provide bomb racks or shackles for releasably carrying jettisonable payload, such as bombs, beneath the aircraft. In one typical installation a jet attack aircraft is provided with three bomb racks, one disposed beneath each wing, and the third disposed beneath the fuselage. Each rack may carry bombs of various weight, each not to exceed the maximum available bomb of 1000 pounds or a total bomb load of 3000 pounds. The weight carrying capacity of the fuselage, however, is 3600 pounds, and the weight carrying capacity of each wing is 1800 pounds. It becomes apparent, accordingly, that when the aircraft is carrying bombs of the maximum weight available its total loading of 3000 pounds is far below is capable load of 7200 pounds. It has been found, moreover, that several smaller bombs are several times as effective as the equivalent weight of a single bomb. As an example, on naval targets six 250 pound bombs are about four times as effective as one 1000 pound bomb. Otherwise equated, 1500 pounds of the smaller 250 pound bombs may produce the equivalent damage of 4000 pounds of the larger 1000 pound bombs. As will thus become apparent, the destructive power of the type of aircraft referred to could be increased many fold by more fully utilizing its load carrying capabilities and also dividing the load into smaller bombs. Probably the most obvious manner of achieving such end would be to provide the aircraft with a greater number of bomb racks. Aircraft, however, are not subject to such modification since considerable structural design would be necessary to provide the necessary supports: Additionally, many aircraft are now in service which could not be readily modified. It thus becomes further apparent that it would be advantageous to render such service aircraft capable of carrying the desired bomb load without extensive modification and particularly with only minor modifications which could be performed in the various service areas for the aircraft.

One proposal for modification of the general type of bomb rack referred to is exemplified by U.S. Patent 2,392,400 to Neff. In this patent an attachment rack is provided which may be secured to a conventional bomb rack, without aircraft alterations, which rack carries a plurality of small bombs. This rack, however, secures the bombs in clusters which must be dropped together thus preventing selective dropping of a single bomb. Structurally, also, it requires special mechanism for releasing the clusters.

One of the objects of the present invention is to provide a bomb rack attachment device for conventional bomb racks which permits selective release of any of a plurality of bombs carried by the device.

Another object is to minimize the requirements for specially fabricated equipment and utilize presently available equipment such as spare parts, surplus, and the like, thus utilizing expensive equipment which would otherwise be approaching obsolescence.

Another object is to provide the attachment with bomb release mechanisms which have fully met all requirements, such as reliability, functioning and the like, imposed by the users of such aircraft.

A further object is to provide an attachment which may be readily fabricated with the type of equipment and material usually available at aircraft service areas, such as military air stations.

Still further objects, advantages and salient features will become more apparent from a consideration of the description to follow, the appended claims, and the accompanying drawing, in which:

FIG. 1 is perspective of an aircraft as viewed from below;

FIG. 2 is an isometric of one form of attachment bomb rack employed with the subject of the invention;

FIG. 3 is a front elevation of FIG. 2 as viewed in the direction of arrow 3, portions being broken away;

FIG. 4 is a perspective, like FIG. 2, of another form of attachment rack;

FIG. 5 is a front elevation of FIG. 4 as viewed in the direction of arrow 5, portions being broken away, and FIG. 6 is an enlarged cross section taken on lines 6—6, FIG. 3.

Referring now to the drawing, FIG. 1 depicts one preferred arrangement of bombs carried by an aircraft which is provided with three conventional bomb racks, one disposed at the lower portion of the fuselage and one each by the wings. In lieu of a total of three large bombs normally carried directly by these three bomb racks, such racks, with the use of intermediate attachment racks forming the subject of the invention now carry a total of sixteen bombs, six by the fuselage bomb rack and five each by the wing bomb racks.

FIGS. 2 and 3 illustrate the fuselage attachment rack which comprises an elongated beam 10 having a pair of longitudinally spaced suspension lugs 12, 12 which engage the bomb release hooks 14, 14 of a conventional bomb rack 16, this much of the structure being similar to that disclosed by the patent to Neff. Pairs of cross beams 18, 18 are secured to the longitudinal beam near its ends, each pair supporting a pair of conventional bomb racks 20, 20 which are of smaller size than bomb rack 16. Bomb racks 20 are similarly provided with a pair of longitudinally spaced conventional release hooks which may be actuated by an explosive operated piston, initiated by an electric current as understood in the art. Bomb racks 20, like bomb rack 16, form no part of the invention per se.

Beam 10 is preferably of tubular or box section to obtain maximum strength with minimum weight. To fabricate it from readily available materials a pair of channel sections 22, 22 may be employed, the webs and lower flanges being cut to the shape shown after which they may be seam welded along the top abutting edges of the flanges, similarly welded along the lower central edges, and shaped plates 23 welded to the webs along the portions which have been cut away, thus forming a rectangular box section of uniform width but of deeper cross section at its central portion than at its ends. Sway braces 24 of flat metal, which engage the adjustable sway brace screws 26 provided on conventional bomb rack 16 may be welded to the box section. Cross beams 18 are constructed of channel section closed by plates 28 (FIG. 6) to form box sections and welded to the longitudinal beam. Gusset plates 30 are welded to both adjacent their junctures. Apertures 32, 34 are provided near the ends of each cross beam to receive an adapter 36 which is welded to the upper and lower walls of the cross beam. Such adapter is an available device which contains internal threads 38 which mate with a hanger bolt 40 which is employed to secure a bomb rack to its supporting structure on an aircraft. Bomb racks 20 may thus be secured to the cross beams without any alterations and employing readily available fastening devices in the fabrication of the attachment rack. Each of the central bomb racks is similarly secured to like adapters which are welded to the lower flange of the box section, a reinforcing plate 42 being provided for added strength. The front end of beam 10 may be closed by a suitable fairing plate 44 which is folded to shape and welded to the beam.

The wing bomb rack attachments are essentially the same as the fuselage bomb rack attachment except that as illustrated they are each constructed of a circular tube 10a to which a pair of rear cross beams 18a, 18a are welded, the ends similarly being provided with the threaded adapters, like adapters also being welded to the tube so that the rear end of the tube may also carry three bomb racks. The front end differs, however, in that the front cross beams 18b, 18b are shorter than the rear cross beams and when supporting their bomb racks the front central bomb rack is omitted. The front end of the tube is provided with the threaded adapters, however, and when the side or lateral bomb racks are omitted a single bomb rack may be supported by the adapters in the front end of the tube.

Obviously many modifications and variations of the present invention are possible in the light of the above teachings. It is therefore to be understood that within the scope of the appended claims the invention may be practiced otherwise than as specifically described.

What is claimed is:

1. Apparatus, in combination, comprising;
   (a) a first conventional aircraft wing or fuselage bomb rack having a single pair of longitudinally spaced release hooks and adjustable sway brace abutments for normally supporting a single bomb by a pair of longitudinally spaced suspension lugs on the bomb,
   (b) an attachment bomb rack including a central beam having a pair of like lugs disposed intermediate its ends with like spacings, supported by said release hooks, in lieu of said bomb,
   (c) said beam having a pair of cross beams adjacent its front end and another pair of cross beams adjacent its rear end,
   (d) a plurality of like second conventional elongated bomb racks, like said first conventional bomb rack, but having release hooks disposed closer together than the release hooks on said first bomb rack,
   (e) said second bomb racks also having adjustable sway brace abutments for engaging a bomb,
   (f) means for securing one of said second bomb racks to each of adjacent ends of each pair of cross beams,
   (g) means for securing another of said second bomb racks to an intermediate portion of the central beam,
   (h) the means for securing all of said second bomb racks comprising a pair of hanger bolts for each of said second bomb racks which are the same as the hanger bolts employed to normally secure said second bomb racks directly to an aircraft.

2. An attachment bomb rack in accordance with claim 1 wherein the front cross beams are of shorter length than the rear cross beams and so proportioned that the bomb rack which may be supported by the beam therebetween is omitted when the front cross beams each support a bomb rack, whereby the front end of the central beam may support only two bomb racks.

3. An attachment bomb rack in accordance with claim 1 secured to the fuselage bomb rack of an aircraft and adapted to carry six bomb racks, three each at its forward and rearward ends, and a like attachment rack secured to each wing bomb rack adapted to carry five racks, two at its forward end and three at its rearward end, whereby the three attachment racks may carry sixteen bombs in lieu of the three bombs normally carried by the fuselage and wing bomb racks of the aircraft.

References Cited in the file of this patent

UNITED STATES PATENTS

| | | |
|---|---|---|
| 2,069,996 | Carleton et al. | Feb. 9, 1937 |
| 2,392,400 | Neff | Jan. 8, 1946 |
| 2,889,746 | Glassman et al. | June 9, 1959 |

FOREIGN PATENTS

| | | |
|---|---|---|
| 554,434 | Great Britain | July 5, 1943 |